US012716447B2

(12) United States Patent
Apostolidis

(10) Patent No.: US 12,716,447 B2
(45) Date of Patent: Aug. 25, 2026

(54) FASTENING DEVICE, ASSEMBLY ARRANGEMENT AND DOMESTIC APPLIANCE

(71) Applicant: BSH Hausgeräte GmbH, Munich (DE)

(72) Inventor: Christopher-Karl Apostolidis, Karlsruhe (DE)

(73) Assignee: BSH Hausgeräte GmbH, Munich (DE)

( * ) Notice: Subject to any disclaimer, the term of this patent is extended or adjusted under 35 U.S.C. 154(b) by 613 days.

(21) Appl. No.: 17/922,608

(22) PCT Filed: May 5, 2021

(86) PCT No.: PCT/EP2021/061841

§ 371 (c)(1),
(2) Date: Nov. 1, 2022

(87) PCT Pub. No.: WO2021/228651

PCT Pub. Date: Nov. 18, 2021

(65) Prior Publication Data

US 2023/0167845 A1 Jun. 1, 2023

(30) Foreign Application Priority Data

May 12, 2020 (DE) ......................... 102020205969.1

(51) Int. Cl.
*F16C 11/04* (2006.01)
*F24C 15/06* (2006.01)
(Continued)

(52) U.S. Cl.
CPC .............. *F16C 11/04* (2013.01); *F24C 15/06* (2013.01); *H05B 6/6408* (2013.01);
(Continued)

(58) Field of Classification Search
CPC . A47B 88/956; A47B 2096/208; F24C 15/06; F16B 12/32; F16B 2200/63; F16B 2200/99; Y10T 403/1608
See application file for complete search history.

(56) References Cited

U.S. PATENT DOCUMENTS

| | | | | |
|---|---|---|---|---|
| 4,190,375 A * | 2/1980 | Berry | ...................... | F16B 7/025 403/187 |
| 6,381,806 B1 * | 5/2002 | Stanesic | ................. | B60N 3/046 16/6 |

(Continued)

FOREIGN PATENT DOCUMENTS

| | | |
|---|---|---|
| DE | 8018796 U1 | 10/1980 |
| DE | 29521059 U1 | 12/1996 |

(Continued)

OTHER PUBLICATIONS

National Search Report DE 102020205969.1 dated Dec. 16, 2020.
International Search Report PCT/EP2021/061841 dated Jul. 28, 2021.

*Primary Examiner* — Michael P Ferguson
(74) *Attorney, Agent, or Firm* — Michael E. Tschupp; Andre Pallapies; Brandon G. Braun

(57) ABSTRACT

A fastening device for fastening a masking plate to an assembly strip of a household appliance includes a base body, an eccentric body receivable in a receiving section of the base body, and a hinge section designed to connect the eccentric body with the base body and to enable the eccentric body to be folded from an initial state, in which the eccentric body is arranged outside of the receiving section, into an end state, in which the eccentric body is received in the receiving section.

15 Claims, 10 Drawing Sheets

(51) Int. Cl.
*H05B 6/64* (2006.01)
*A47B 96/20* (2006.01)

(52) U.S. Cl.
CPC ..... *A47B 2096/208* (2013.01); *F16B 2200/63* (2023.08); *F16B 2200/99* (2023.08)

(56) References Cited

U.S. PATENT DOCUMENTS

| | | | | |
|---|---|---|---|---|
| 9,119,468 | B2 * | 9/2015 | Mensa | A47B 88/956 |
| 10,660,437 | B2 * | 5/2020 | Prentner | A47B 88/956 |
| 2004/0240950 | A1 | 12/2004 | Trettin | |
| 2017/0175789 | A1 | 6/2017 | Mätzler | |

FOREIGN PATENT DOCUMENTS

| | | | | | |
|---|---|---|---|---|---|
| DE | 202008012170 | U1 | | 9/2009 | |
| DE | 202009016669 | U1 | | 4/2011 | |
| DE | 102011077828 | A1 | | 12/2012 | |
| EP | 0 166 794 | | * | 7/1984 | F16B 12/50 |
| EP | 2786675 | A2 | | 10/2014 | |
| EP | 2 637 524 | | * | 2/2019 | A47B 88/956 |
| GB | 2329467 | B | | 8/2001 | |

* cited by examiner

FASTENING DEVICE, ASSEMBLY ARRANGEMENT AND DOMESTIC APPLIANCE

CROSS-REFERENCES TO RELATED APPLICATIONS

This application is the U.S. National Stage of International Application No. PCT/EP2021/061841, filed May 5, 20201, which designated the United States and has been published as International Publication No. WO 2021/228651 A1 and which claims the priority of German Patent Application, Serial No. 10 2020 205 969.1, filed May 12, 2020, pursuant to 35 U.S.C. 119(a)-(d).

The contents of International Application No. PCT/EP2021/061841 and German Patent Application, Serial No. 10 2020 205 969.1 are incorporated herein by reference in their entireties as if fully set forth herein.

BACKGROUND OF THE INVENTION

The present invention relates to a fastening device for fastening a masking plate to an assembly strip of a household appliance, an assembly arrangement for a household appliance with a fastening device of this type and a household appliance with a fastening device of this type and/or with an assembly arrangement of this type.

With household appliances assembled in pieces of furniture, such as for instance in a built-in single oven, masking plates are often used to conceal an intermediate space between the piece of furniture and the household appliance. In this case gaps which are to have as uniform a gap width as possible for visual reasons are provided between the household appliance and the masking plate and between the masking plate and the piece of furniture. To this end it is necessary to be able to adjust a position of the masking plate.

BRIEF SUMMARY OF THE INVENTION

Against this background, an object of the present invention consists in providing an improved fastening device.

Accordingly, a fastening device is proposed for fastening a masking plate to an assembly strip of a household appliance. The fastening device comprises a base body, an eccentric body, which can be received in a receiving section of the base body, and a hinge section, which connects the eccentric body with the base body, wherein with the aid of the hinge section the eccentric body can be folded from an initial state, in which the eccentric body is arranged outside of the receiving section, into an end state, in which the eccentric body is received in the receiving section.

As a result of the eccentric body being connected to the base body with the aid of the hinge section, the eccentric body and the base body are undetachably connected to one another. This facilitates the manufacture of the fastening device. For instance, the fastening device can thus be manufactured cost-effectively as a plastic injection molded component.

The masking plate can also be referred to as a decorative panel, design panel, design pilaster, masking pilaster or decorative pilaster. The assembly strip can also be referred to as a technical pilaster. The assembly strip can be connected to the household appliance, for instance screwed hereto. The household appliance can be assembled in a piece of furniture with the aid of the assembly strip. Two assembly strips of this type which are arranged on sides walls on both sides of the household appliance are preferably assigned to the household appliance. The household appliance can be an oven, a combination microwave oven, a microwave, a washing machine, a dishwasher, a tumble dryer, a refrigerator, a fully automatic coffee machine, a warming drawer or such like, for instance.

The receiving section is preferably embodied as a borehole which penetrates the base body. In other words, the receiving section is preferably circular. Accordingly, the eccentric body is also designed to be cylindrical at least in sections, so that this can be received at least partially in the receiving section. The hinge section is preferably embodied as a film hinge. Here a "film hinge" is understood to mean a cross sectional constriction between the base body and the eccentric body, which has such thin walls that the eccentric body can be pivoted with respect to the base body. The eccentric body is preferably press fitted into the receiving section for transfer from the initial state into the end state. In this regard the eccentric body can lock in the receiving section. The eccentric body is mounted rotatably in the receiving section.

According to one embodiment, the eccentric body is disposed in the end state in a zero position, wherein the eccentric body can be rotated out of the zero position into any angular position, and wherein the hinge section shears off when the eccentric body is rotated out of the zero position.

With the aid of the hinge section, it is therefore possible to ensure that the eccentric body is always positioned in the zero position in the receiving section of the base body when said eccentric body is folded from the initial state into the end state. A twisting of the eccentric body in order to transfer this into the zero position is therefore not necessary. This facilitates the handling of the fastening device. When the eccentric body is twisted with respect to the base body, the hinge section breaks. To this end, the hinge section is embodied with particularly thin walls so that this can be sheared off with minimal effort.

According to a further embodiment, the base body has a suspension section for suspending the fastening device in an assembly aperture provided on the assembly strip.

The suspension section is preferably hook-shaped. The suspension section extends out from the base body and is connected in one piece, in particular integrally, with the base body. "In one piece" or "integrally" here mean that the base body and the suspension section form a shared component and are not composed of a number of components. "Integrally" here means that the base body and the suspension section are manufactured continuously from the same material.

According to a further embodiment, the base body has a locking section for engaging the fastening device into the assembly aperture.

The locking section can be deformed in an elastic, in particular resilient manner. In order to fasten the fastening device to the assembly aperture, the suspension section is firstly introduced or suspended in the assembly aperture. The locking section is then pressed into the assembly aperture, wherein this deforms in a resilient manner and engages or snap-fits into the assembly aperture.

According to a further embodiment, the fastening device is a single piece, in particular an integral plastic component.

The fastening device is preferably a plastic injection molded component. For instance, the fastening device can be manufactured from polyethylene (PE), acrylonitrile butadiene styrene (ABS), polypropylene (PP) or from another suitable plastic material. Alternatively, the fastening device can also be manufactured from metal.

According to a further embodiment, the base body has resiliently deformable snap-fit arms, which are designed to snap-fit in a form-fit manner into the masking plate.

A form-fit connection is produced by way of the interlocking or rear engagement of at least two connection partners, in the present case the snap-fit arms and the masking plate. In order to connect the masking plate with the fastening device, this is impressed onto the fastening device, as a result of which the snap-fit arms deform in a resilient manner and engage in the masking plate.

According to a further embodiment, the snap-fit arms are connected to one another with the aid of a resiliently deformable spring section.

The spring section is preferably curved in the shape of an arch. The base body, the snap-fit arms and the spring section are embodied in one piece, in particular integrally.

According to a further embodiment, the base body has a height position section in order to position the fastening device on the masking plate, wherein the height position section is designed to engage in a form-fit manner in cut-outs provided on the masking plate.

In particular, the cut-outs are provided on the rear of the masking plate. The height position section is strip-shaped and projects laterally beyond the base body on both sides. On account of the form-fit engagement of the height position section into the cut-out of the masking plate, an accurate vertical positioning of the masking plate on the fastening device is made possible.

According to a further embodiment, the eccentric body has an engagement section which is designed to engage in a form-fit manner into the receiving section.

The engaging section preferably has a cylindrical geometry. The engaging section is mounted rotatably in the receiving section. In particular, the engaging section can engage in the receiving section.

According to a further embodiment, the engaging section has a tool cut-out, in which a tool for rotating the eccentric body can be received.

The engaging section can be suited to receiving a blade of a slot-head screwdriver or a Phillips screwdriver. A simple rotation of the eccentric body with respect to the base body is possible in this way.

According to a further embodiment, the eccentric body has a cylindrical eccentric section, which is connected eccentrically with the engaging section.

Here “eccentrically” means that the eccentric section and the engaging section has no shared central axis or axis of symmetry. In other words, in particular, axes of symmetry of the eccentric section and the engaging section are arranged at a distance from one another or offset with respect to one another. A disk-shaped intermediate section can be provided between the eccentric section and the engaging section, said intermediate section connecting the engaging section in one piece, in particular integrally, with the eccentric section. A pocket-shaped receiving section in which the intermediate section is mounted in a rotatable manner can be provided on the base body for the intermediate section. The intermediate section preferably has a larger diameter than the engaging section and the eccentric section.

According to a further embodiment, the eccentric section has a tool cut-out, in which a tool for rotating the eccentric body can be received.

The tool cut-out can be suited to receiving a blade of a slot-head screwdriver or Phillips screwdriver. Here the tool cut-out of the engaging section and the tool cut-out of the eccentric section preferably have two geometries which differ from one another. In other words, for instance, the tool cut-out of the engaging section is suited to receiving a blade of a slot-head screwdriver and the engaging section of the eccentric section is suited to receiving a blade of a Phillips screwdriver. As a result of two tool cut-outs being provided, it is possible to control the eccentric body from two sides of the fastening device.

Furthermore, an assembly arrangement is proposed for a household appliance. The assembly arrangement comprises an assembly strip and a fastening device, as explained previously, wherein the fastening device is transferred into the end state, wherein the fastening device is fastened to the assembly strip and wherein the fastening device moves a linear manner with respect to the assembly strip when the eccentric body is twisted relative to the base body.

In this regard, the eccentric section of the eccentric body is received in the assembly aperture of the assembly strip and rests against lateral contours of the same. When the eccentric body is twisted relative to the base body, the eccentric body displaces the fastening device in a horizontal direction or width direction linearly with respect to the assembly strip. In this way it is easily possible to adjust a gap between the masking plate and the item of furniture or between the masking plate and a door and/or a control panel of the household appliance. Two assembly arrangements of this type which are arranged on both sides of the household appliance are preferably assigned to the household appliance. The assembly arrangements can be screwed to the household appliance.

According to one embodiment, the assembly arrangement comprises a masking plate which is connected to the assembly strip with the aid of the fastening device.

Two fastening devices which are arranged one above the other viewed along a height direction are preferably assigned to the masking plate. As a result of two fastening devices being provided, the ability to adjust the masking plate is improved. The masking plate can be clipped hereon after adjusting the fastening device or the fastening devices. Here the resilient snap-fit arms of the fastening device deform and engage in the masking plate. Alternatively, the masking plate can also be snap-fitted hereon before adjusting the fastening device. In this case, an adjustment of the fastening device from a rear side of the assembly strip is possible.

Furthermore, a household appliance with a fastening device of this type and/or an assembly arrangement of this type is proposed.

As mentioned previously, the household appliance can be any household appliance, such as for instance a cooker, an oven, a combination microwave oven, a microwave, a refrigerator, a washing machine, a tumble dryer, a dishwasher or the like. The household appliance, as mentioned previously, preferably has two assembly arrangements of this type and four fastening devices.

Further possible implementations of the fastening device, the assembly arrangement and/or of the household appliance also comprise combinations-not explicitly mentioned-of features or embodiments described above or below in respect of the exemplary embodiments. Here the person skilled in the art will also add individual aspects as improvements or amendments to the respective basic form of the fastening device, the assembly arrangement and/or the household appliance.

BRIEF DESCRIPTION OF THE DRAWINGS

Further advantageous embodiments and aspects of the fastening device, the assembly arrangement and/or the household appliance form the subject matter of the subclaims and the exemplary embodiments of the fastening device, the assembly arrangement and/or the household appliance described below. The fastening device, the assembly arrangement and/or the household appliance are further explained in greater detail below on the basis of preferred embodiments with reference to the appended figures.

DETAILED DESCRIPTION OF EXEMPLARY EMBODIMENTS OF THE PRESENT INVENTION

Figure 1:
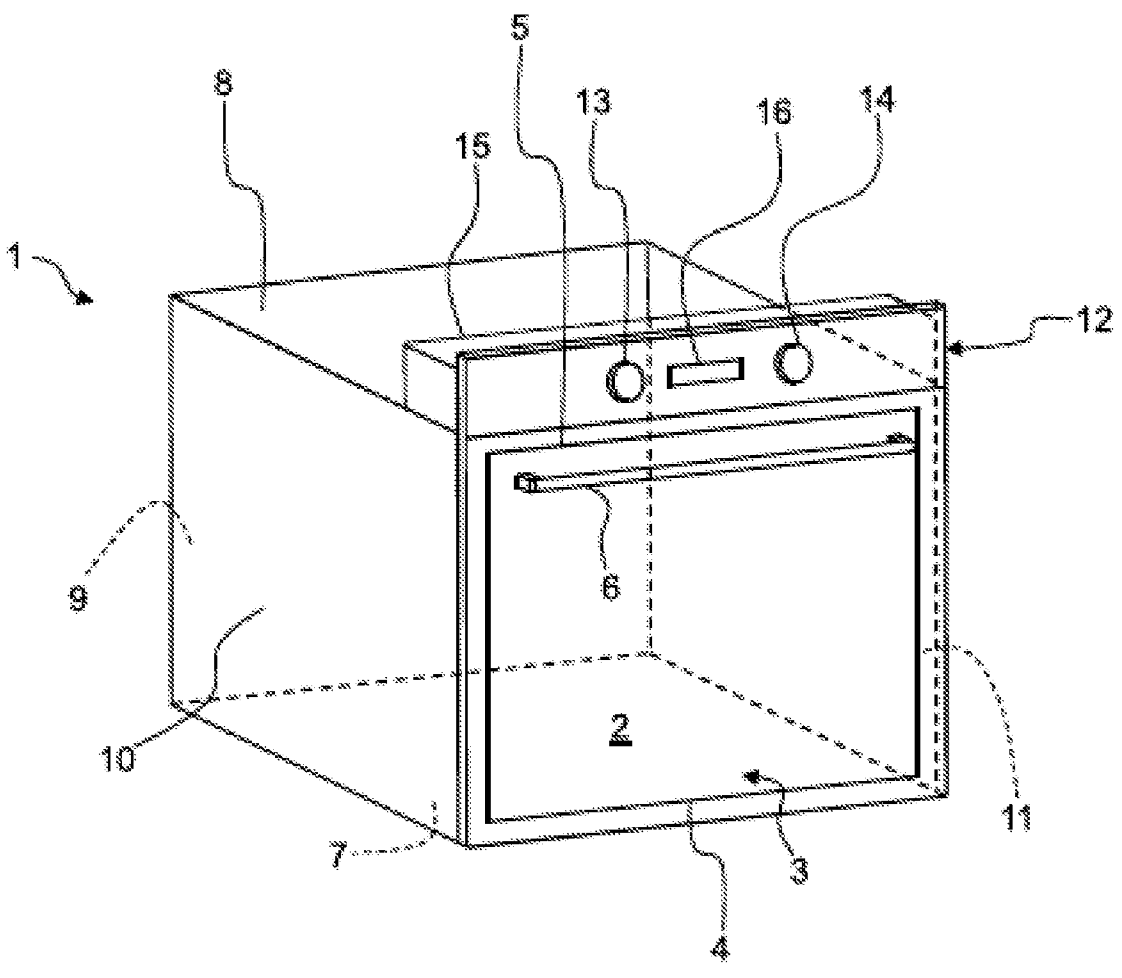
FIG. 1 shows a schematic perspective view of an embodiment of a household appliance.

In the figures, elements that are identical or have the same function have been provided with the same reference characters unless otherwise stated.

FIG. 1 shows a schematic perspective view of an embodiment of a household appliance 1. The household appliance 1 can be an oven, a combination microwave oven, a double oven, a microwave, a refrigerator, a fully automatic coffee machine, a warming drawer, a dishwasher, a washing machine, a dryer or the like. Subsequently it will be assumed, however, that the household appliance 1 is a household cooking appliance, such as an oven, for instance.

The household appliance 1 has a cooking compartment 2, which can be closed with the aid of a door 3. The cooking compartment 2 can also be referred to as a muffle or oven muffle. The cooking compartment 2 can be arranged in the inside of a housing of the household appliance 1. The door 3 is shown in a closed position in FIG. 1. The door 3 can be closed or opened by pivoting about a pivot axis provided on a lower end of the door 3 or a lower edge 4 of the door 3. Alternatively, the door 3 can be attached laterally to the cooking compartment 2. Furthermore, the door 3 can be arranged on a baking tray which can be pulled out from the receiving space 2.

A handle 6 can be provided on an upper section or on an upper edge 5 of the door 3. The cooking compartment 2 has a base 7, a ceiling 8 arranged opposite to the base 7, a rear wall 9 arranged facing the closed door 3 and two side walls 10, 11 arranged facing one another. The cooking compartment 2 is preferably box- or cube-shaped. The cooking compartment 2 can be produced from a metal material, in particular from sheet steel.

The household appliance 1 further comprises control knobs 13, 14 provided on an operating panel or control panel 12. The control knobs 13, 14 can be rotatable, for instance. A control facility 15, only shown schematically, for controlling the household appliance 1 can be provided on the rear of the control panel 12. The control facility 15 can be a regulating and/or control facility. A display 16 can also be provided on the control panel 12. An operating state of the household appliance 1 can be displayed with the aid of the display 16. For instance, a temperature set with the aid of one of the control knobs 13, 14 can be displayed with the aid of the display 16.

Figure 2:
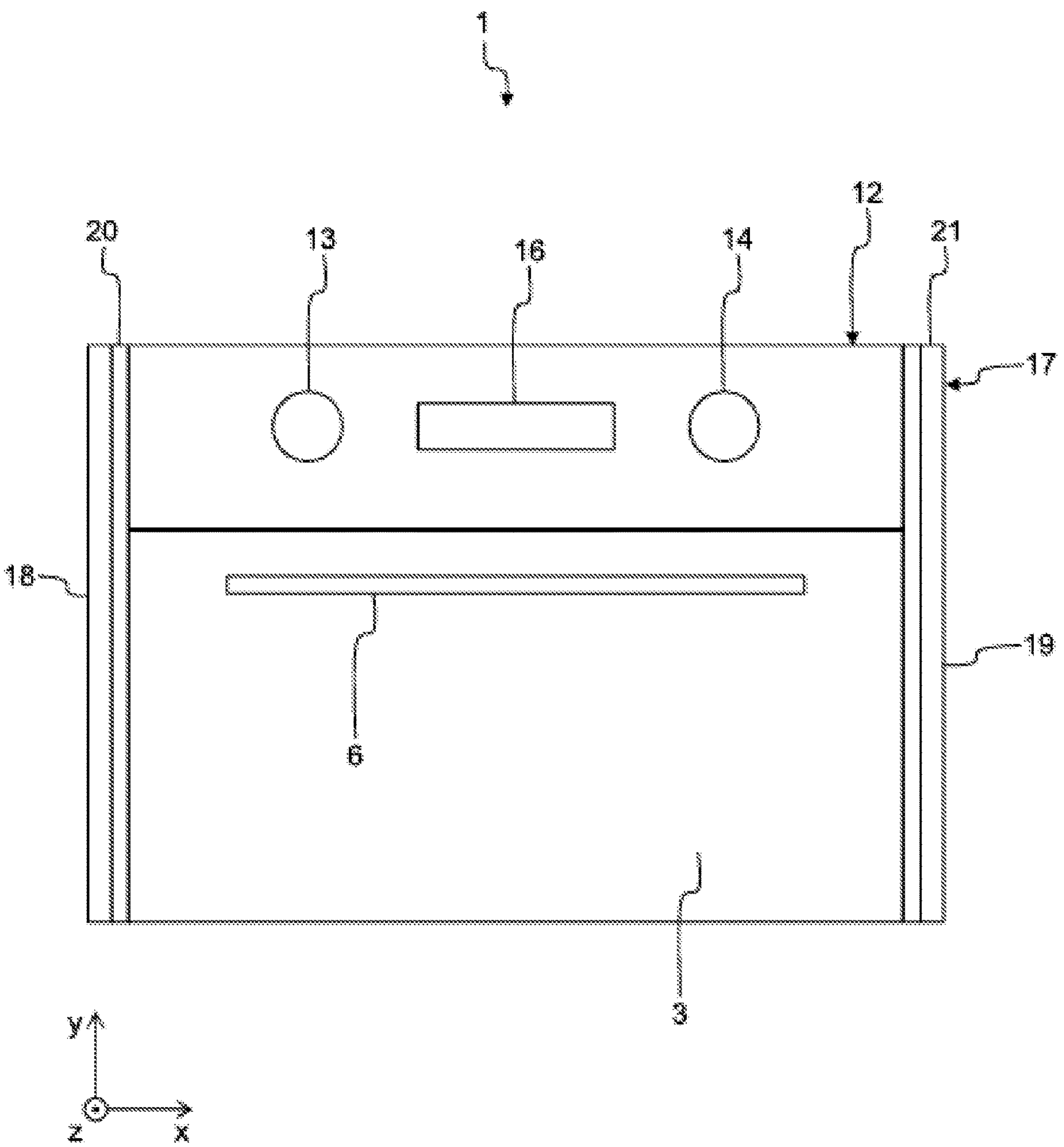
FIG. 2 shows a schematic front view of the household appliance according to FIG. 1.

As FIG. 2 shows, the household appliance 1 can be integrated into an item of furniture 17, of which only two side walls 18, 19 opposing one another are shown, however. In order to conceal a respective intermediate space between the household appliance 1 and the side wall 18, 19 of the item of furniture 17, the household appliance 1 comprises masking plates 20, 21. The masking plates 20, 21 conceal the intermediate spaces between the side walls 18, 19 of the item of furniture 17 and the household appliance 1. The masking plates 20, 21 can also be referred to as decorative panels, design panels, masking pilasters, design pilasters or decorative pilasters. In order to achieve a visually appealing design of the household appliance 1 integrated into the item of furniture 17, it is necessary for a uniform gap which extends over the entire length of the masking plate 20 to be provided between the side wall 18 and the masking plate 20 and between the masking plate 20 and the control panel 12 and the door 3 in each case. The same applies to the masking plate 21.

A coordinate system with an x-direction or width direction x, a y-direction or height direction y and a z-direction or depth direction z is assigned to the household appliance 1. The directions x, y, z are positioned at right angles to one another. The masking plates 20, 21 run as elongated components along the height direction y. In order to be able to adjust the previously mentioned gap, it is advantageous to be able to linearly adjust the masking plates 20, 21 along the width direction x.

Figure 3:
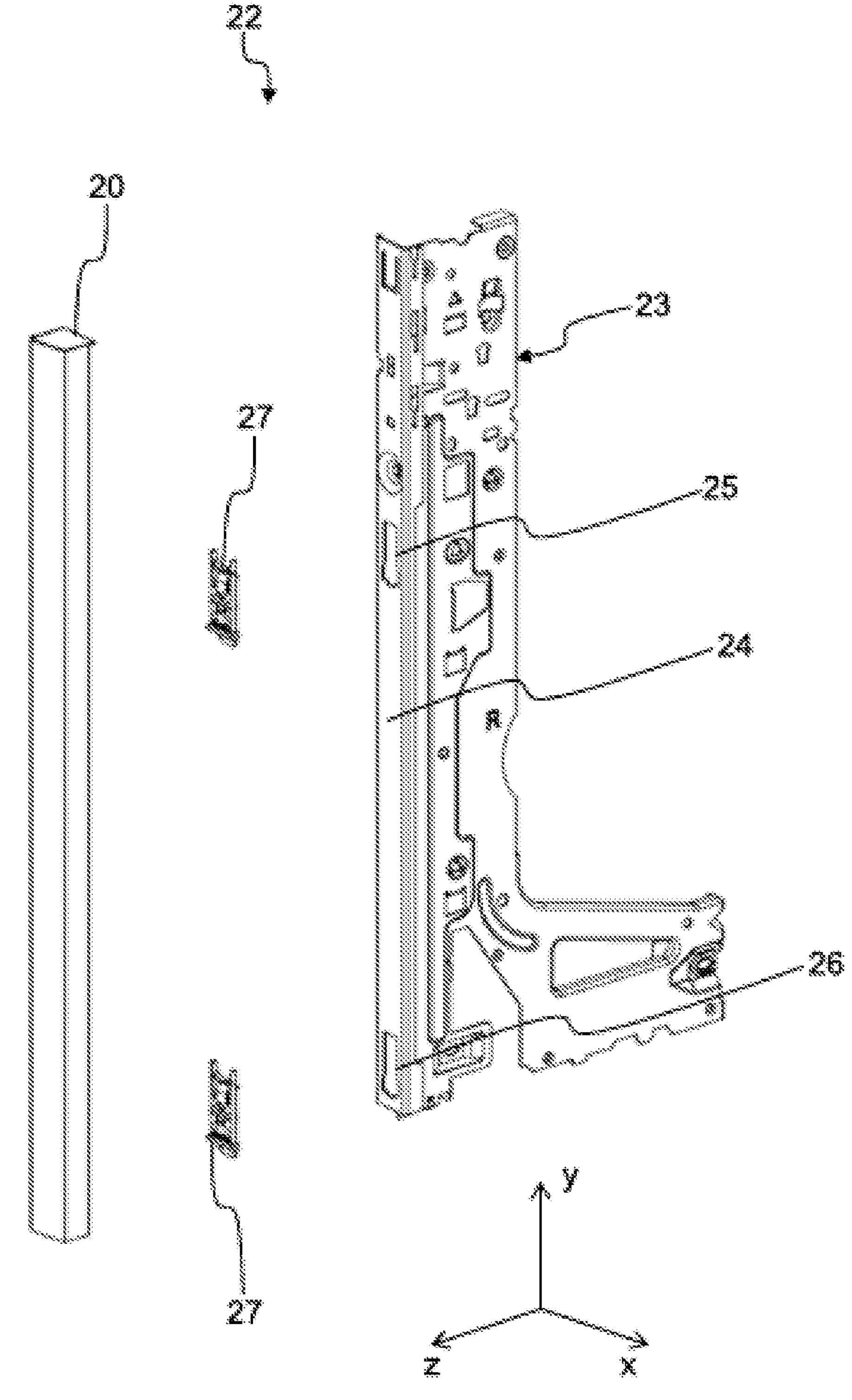
FIG. 3 shows a schematic perspective exploded view of an embodiment of an assembly arrangement for the household appliance according to FIG. 1.

FIG. 3 shows a schematic perspective exploded view of an assembly arrangement 22 for the household appliance 1. Two assembly arrangements 22 of this type which are arranged on both sides of the household appliance 1 are preferably provided. The assembly arrangement 22 shown in FIG. 3 is assigned to the side wall 10 for instance and screwed hereto. Only an assembly arrangement 22 is assumed below.

The assembly arrangement 22 comprises an assembly strip 23 in addition to the masking plate 20. The assembly strip 23 can also be referred to as technical pilaster or be a technical pilaster. The assembly strip 23 can be a bent sheet metal component. The assembly strip 23 comprises a flat assembly surface 24, on which the masking plate 20 can be assembled. Two assembly apertures 25, 26 are provided on the assembly surface 24. The assembly apertures 25, 26 are preferably embodied to be identical. The assembly apertures 25, 26, viewed along the height direction y, are arranged at a distance from one another.

A fastening device 27 is assigned to each assembly aperture 25, 26. The fastening devices 27 are of the same construction. The masking plate 20 is connected to the assembly strip 23 with the aid of the fastening devices 27. In this way the fastening device 27 allows the masking plate 20 to be adjusted along the width direction x, in order to adjust the gaps between the side wall 18 of the piece of furniture 17 and the masking plate 20 or between the masking plate 20 and the control panel 12 and the door 3. The fastening devices 27 are positioned between the assembly surface 24 and the masking plate 20. The same applies to the masking plate 21. Reference is made below to just one fastening device 27.

Figure 4:
FIG. 4 shows a schematic perspective view of an embodiment of a fastening device for the assembly arrangement according to FIG. 3.
Figure 4:
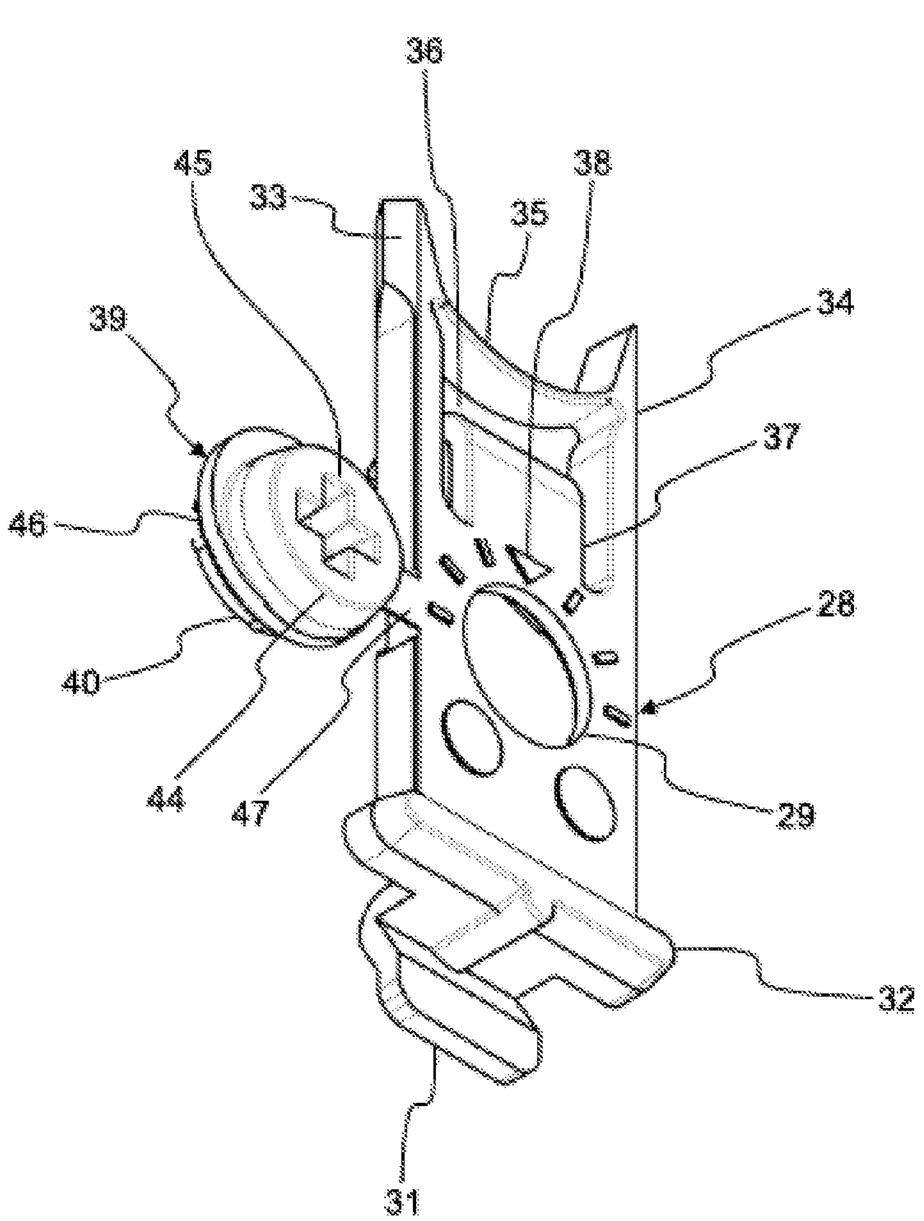
Figure 5:
FIG. 5 shows a further schematic perspective view of the fastening device according to FIG. 4.
Figure 5:
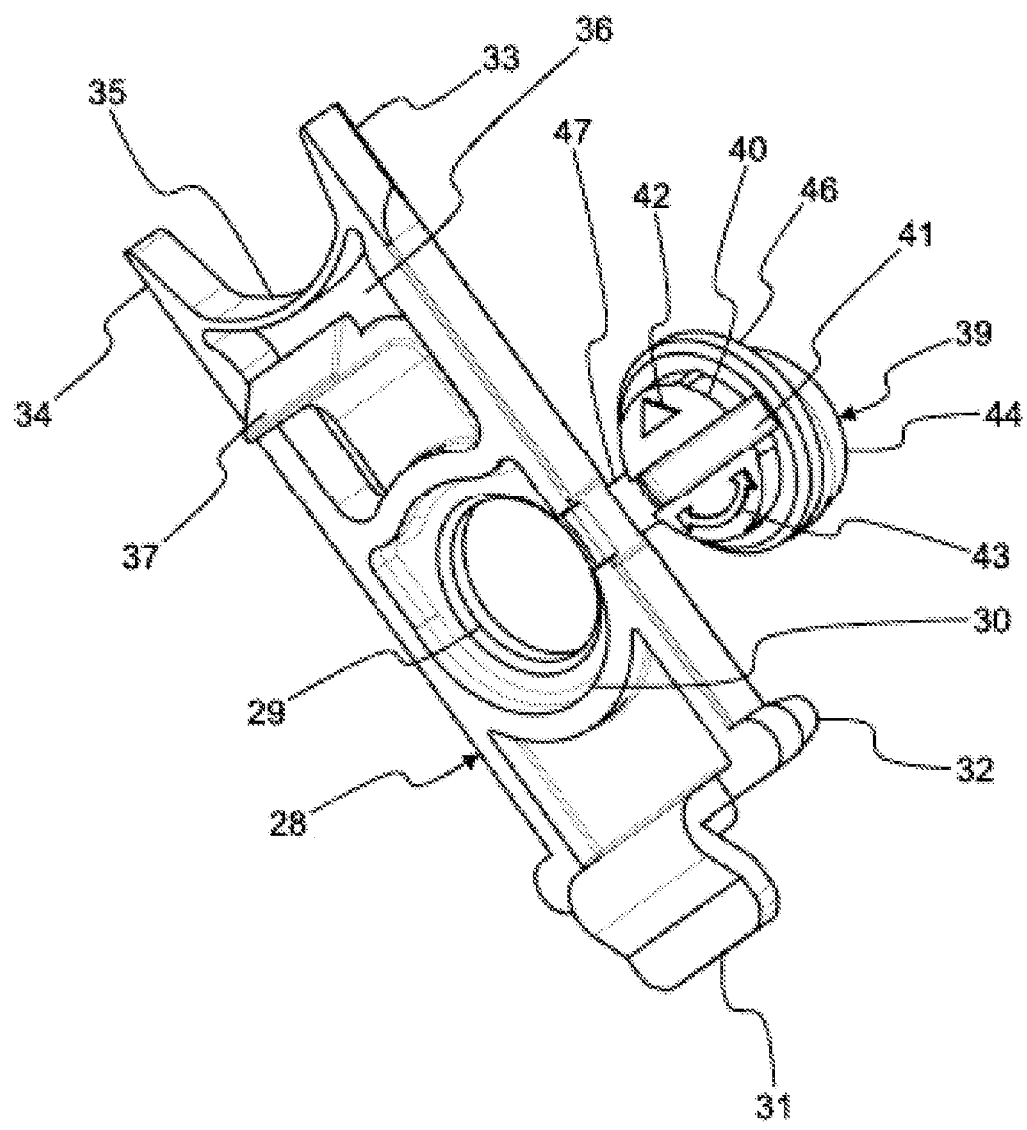
Figure 6:
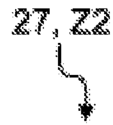
FIG. 6 shows a schematic front view of the fastening device according to FIG. 4.
Figure 6:
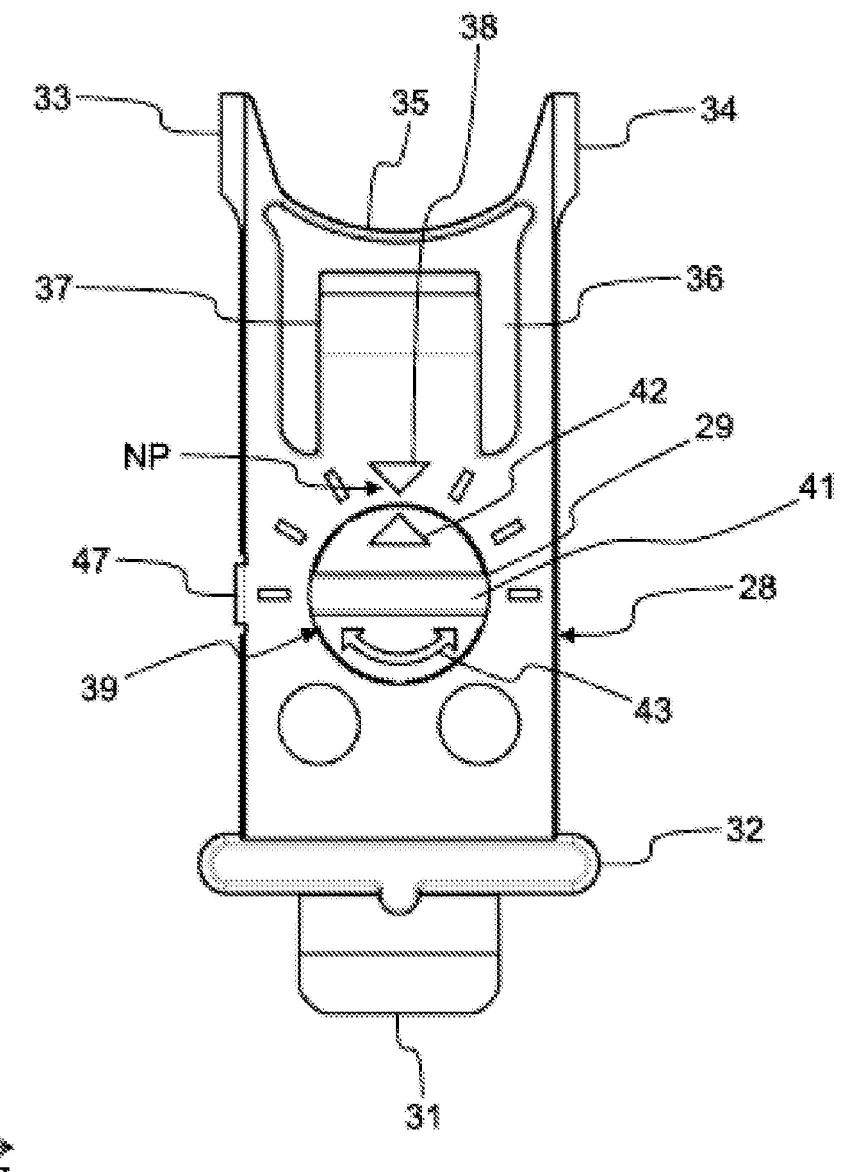
Figure 7:
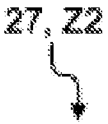
FIG. 7 shows a schematic rear view of the fastening device according to FIG. 4.
Figure 7:
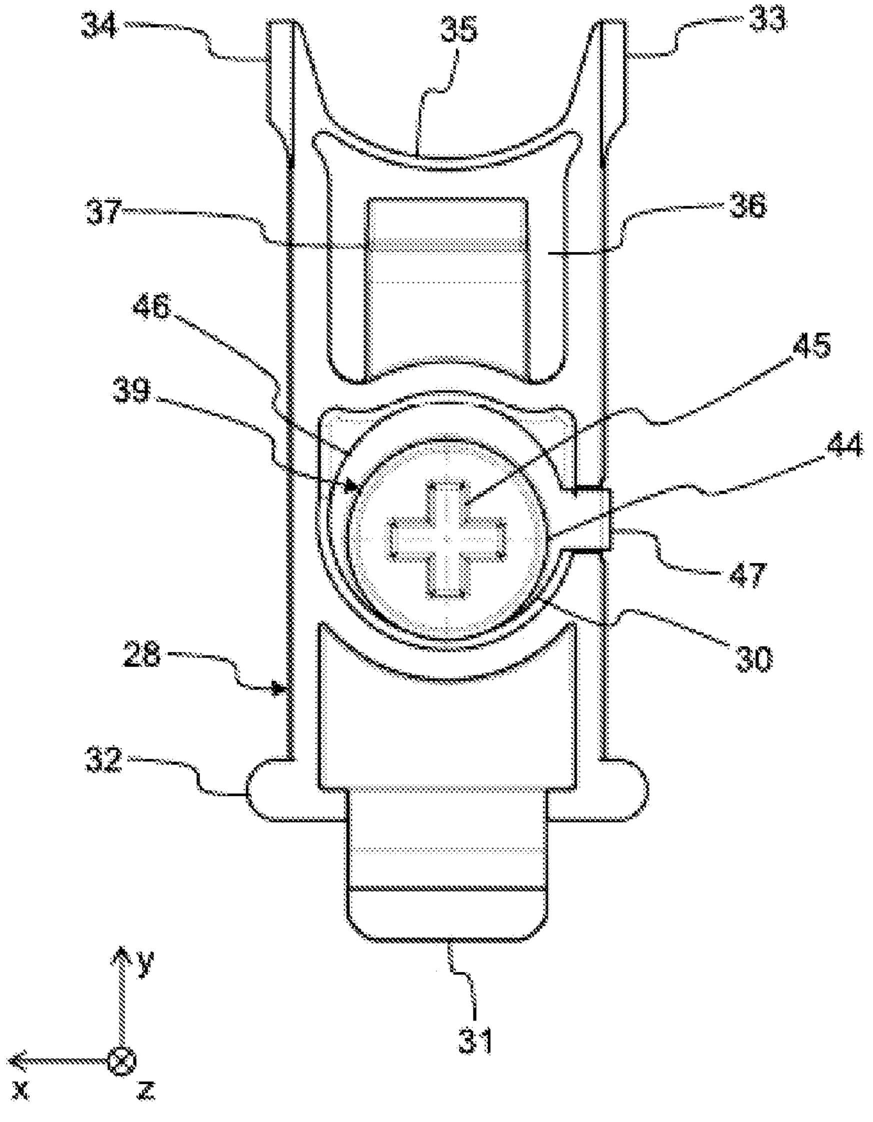

FIG. 4 shows a schematic perspective view of an embodiment of a fastening device 27. FIG. 5 shows a further schematic perspective view of the fastening device 27. FIG. 6 shows a schematic front view of the fastening device. FIG. 7 shows a schematic rear view of the fastening device 27. Reference is made below simultaneously to FIGS. 4 to 7.

The fastening device 27 is single piece, in particular integral plastic component. “Single piece” or “integral” means here that the fastening device 27 is not composed of several components but instead that the fastening device forms a single component. “Integral” means here that the fastening device 27 is manufactured continuously from the same material. For instance, the fastening device 27 can be manufactured from polyethylene (PE), acrylonitrile butadiene styrene (ABS), polypropylene (PP) or from any other suitable plastic material.

The fastening device 27 comprises a base body 28. The base body 29 is essentially rectangular or plate-shaped. The base body 28 has a receiving section 29 in the form of a borehole which penetrates the base body 28. The receiving section 29 can be circular. In the orientation in FIGS. 5 and 7, a further receiving section 30 is provided to the rear of the base body 28. The receiving section 30 does not fully penetrate the base body 28, however, but is instead embodied as a pocket provided on the basis body 28.

A hook-shaped suspension section 31 which enables the fastening device 27 to be suspended in the respective assembly aperture 25, 26 is provided on the base body 28. In the orientation in FIGS. 4 to 7, the suspension section 31 extends out from the base body 28 from below and away herefrom. The suspension section 31 can be deformed in a resilient manner. A strip-shaped height position section 32 adjoins the suspension section 31. The height position section 32 extends laterally out from the base body 28 on both sides and is suited to engaging in a form-fit manner into corresponding cut-outs provided on the masking plate 20. A form-fit connection is produced by way of the interlocking or rear engagement of at least two connection partners, in the present case the height position section 32 and the cut-outs of the masking panel 20.

Two resiliently deformable snap-fit arms 33, 34 are provided on an end section of the base body 28 which faces away from the suspension section 31 and the height position section 32 and which are designed to snap-fit or engage in a form-fit manner into the masking plate 20. The snap-fit arms 33, 34 are connected in one piece, in particular integrally, with the aid of a resiliently deformable spring section 35. The spring section 35 is curved in the shape of an arch. The snap-fit arms 33, 34 and the spring section 35 thus enclose a cut-out 36 which penetrates the base body 28.

A resiliently deformable locking section 37 extends into the cut-out 36 and out from the base body 28. The locking section 37 is preferably embodied as a locking latch or snap-fit hook. The locking section 37 is suited to engaging in a form-fit manner into the corresponding assembly aperture 25, 26. Display symbols 38, of which only one in FIGS. 4 and 6 is provided in each case with a reference character, are distributed about the receiving section 29. The display symbols 38 can be embodied in the shape of an arrow, triangle or strip.

In addition to the base body 28, the fastening device comprises an eccentric body 39. The eccentric body 39 in turn comprises an engaging section 40, which is cylindrical. The engaging section 40 can be pressed into the receiving section 29, so that the eccentric body 39 locks into the receiving section 29. In other words, the engaging section 40 engages in the receiving section 29 in a form-fit manner. The engaging section 40 comprises a tool cut-out 41, in which a tool for rotating the eccentric body 39 can be received. The tool cut-out 41 can be suited to receiving a blade of a slot-head screwdriver. Furthermore, the engaging section 40 comprises a display symbol 42 and a display symbol 43 which displays a possible direction of rotation of the eccentric body 39. The display symbol 42 can be in the shape of an arrow or triangle.

Aside from the engaging section 40, the eccentric body 39 comprises a cylindrical eccentric section 44. The eccentric section 44 is arranged eccentrically with respect to the engaging section 40. In other words, the engaging section 40 and the eccentric section 44 do not have a shared center axis or axis of symmetry, but instead an axis of symmetry of the engaging section 40 and an axis of symmetry of the eccentric section 44 are at a distance from one another or positioned offset from one another. The eccentric section 44 likewise comprises a tool cut-out 45, in which a tool for rotating the eccentric body 39 can be received. In particular, the tool cut-out 45 is suited to receiving a blade of a Phillips screwdriver.

There is provision for a disk-shaped intermediate section 46 between the engaging section 40 and the eccentric section 44. The intermediate section 46 is cylindrical. The intermediate section 46 and the engaging section 40 have a shared axis of symmetry. Here a diameter of the intermediate section 46 is larger than a diameter of the engaging section 40 or larger than a diameter of the receiving section 29. The diameter of the intermediate section 46 is marginally smaller than a diameter of the receiving section 30 so that the intermediate section 46 can be received in the receiving section 30.

The eccentric body 39 and the base body 28 are connected to one another in one piece, in particular integrally, with the aid of a hinge section 47. The hinge section 47 is in particular a film hinge. A “film hinge” is currently understood to mean a material constriction or material restriction which can be deformed elastically. The eccentric body 39 can therefore be pivoted with respect to the base body 28 with the aid of the hinge section 47.

The functionality of the fastening device 27 is explained below. The eccentric body 39 is firstly pivoted with respect to the base body 28 with the aid of the hinge section 47 such that the eccentric body 39, in particular the engaging section 40 of the eccentric body 39, is received in the receiving section 29 of the base body 28. To this end, the eccentric body 39 is pressed into the receiving section 29 where it locks. In this regard, the intermediate section 46 is also received in the receiving section 30 provided on the rear of the base body 28.

With the aid of the hinge section 47 the eccentric body 39 is therefore transferred from an initial state Z1, shown in FIGS. 4 and 5, in which the eccentric body 39 is arranged outside of the receiving section 29, into an end state Z2, shown in FIGS. 6 and 7, in which the eccentric body 39, in particular the engaging section 40 of the eccentric body 39, is received in the receiving section 29 and in particular locks herein.

As FIG. 6 shows, the eccentric body 39 in the end state Z2 is firstly disposed in a zero position NP, in which the display symbol 38 points to the display symbol 42. In the zero position NP, the eccentric section 44, as shown in FIG. 7, is arranged centrally on the base body 28 with respect to the width direction x. A fastening device 27 is then suspended in each assembly aperture 25, 26 of the assembly strip 23 with the aid of the suspension section 31. With the aid of impressing the respective fastening device 27 in the respective assembly aperture 25, 26, the locking section 37 deforms resiliently and snap fits into the respective assembly aperture 25, 26. The fastening devices 27 are now connected in a form-fit manner with the assembly strip 23.

Figure 8:
FIG. 8 shows a schematic detailed view of the assembly arrangement according to FIG. 3.
Figure 8:
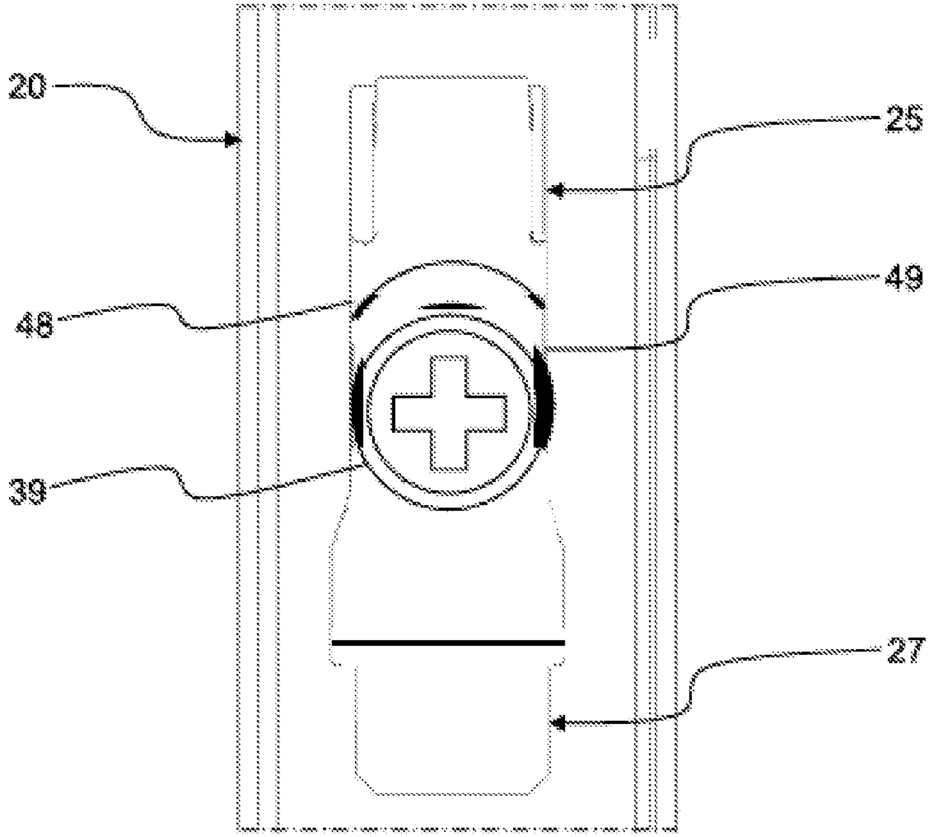
Figure 8:
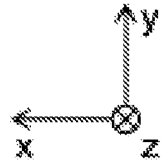
Figure 9:
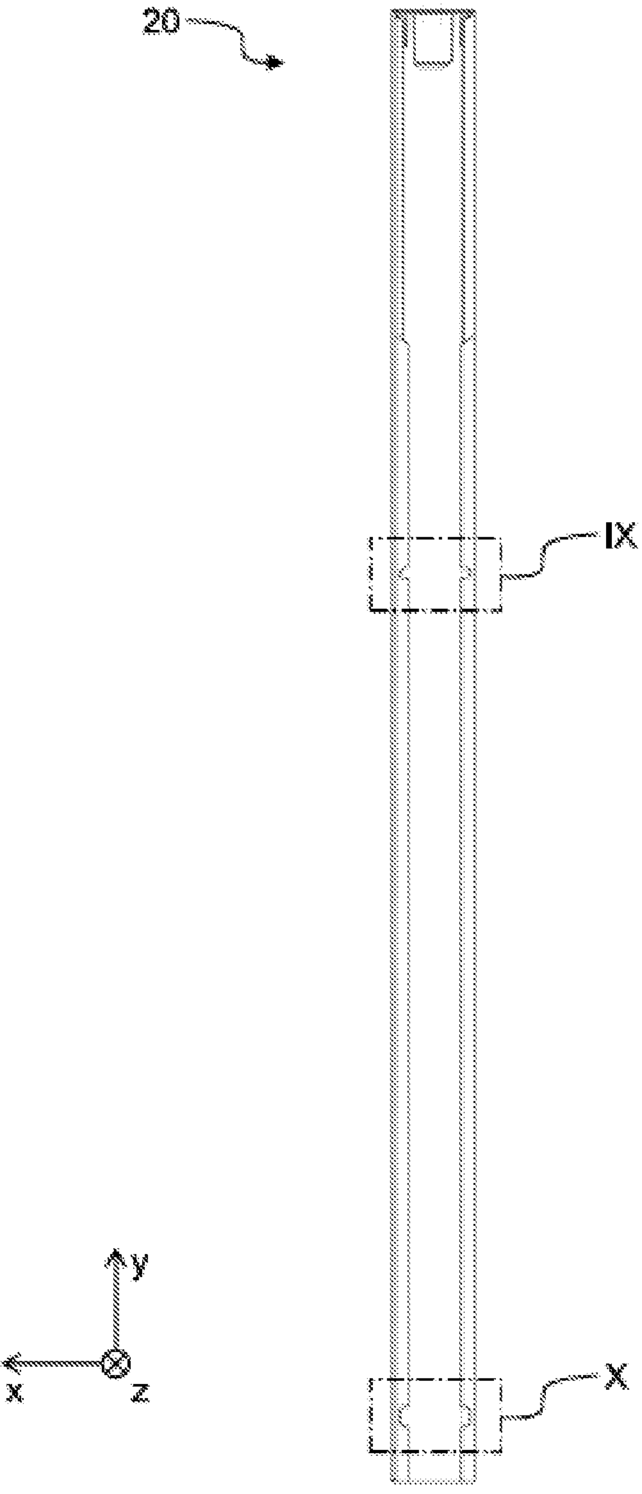
FIG. 9 shows a schematic rear view of an embodiment of a masking plate for the assembly arrangement according to FIG. 3.

The eccentric body 39 can then be rotated out of the zero position NP either in the clockwise or counterclockwise direction with the aid of a tool inserted into the tool cut-out 41. In this way, as shown in FIG. 8, the eccentric body 39 rests on side contours 48, 49 of the respective assembly aperture 25, 26. When the eccentric body 39 is twisted, the eccentric section 44 moves in the width direction x either to the left or to the right, so that the fastening device 27 itself also moves linearly along the width direction x with respect to the assembly strip 23. To this end, there is provision for adequate play between the side contours 48, 49 of the respective assembly aperture 25, 26 and the suspension section 31 received herein and the locking section 37, which enables a movement of the fastening device 27 with respect to the assembly strip 23 along the width direction x. With the aid of a different adjustment of the two fastening devices 27, the masking plate 20 can be tilted.

Figure 10:
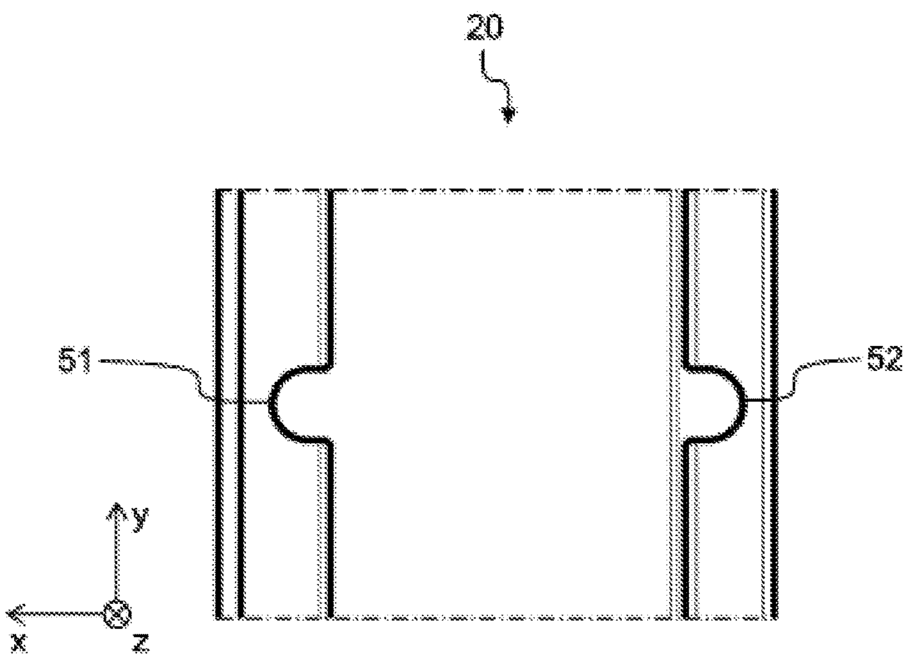
FIG. 10 shows the detailed view X according to FIG. 9.
Figure 11:
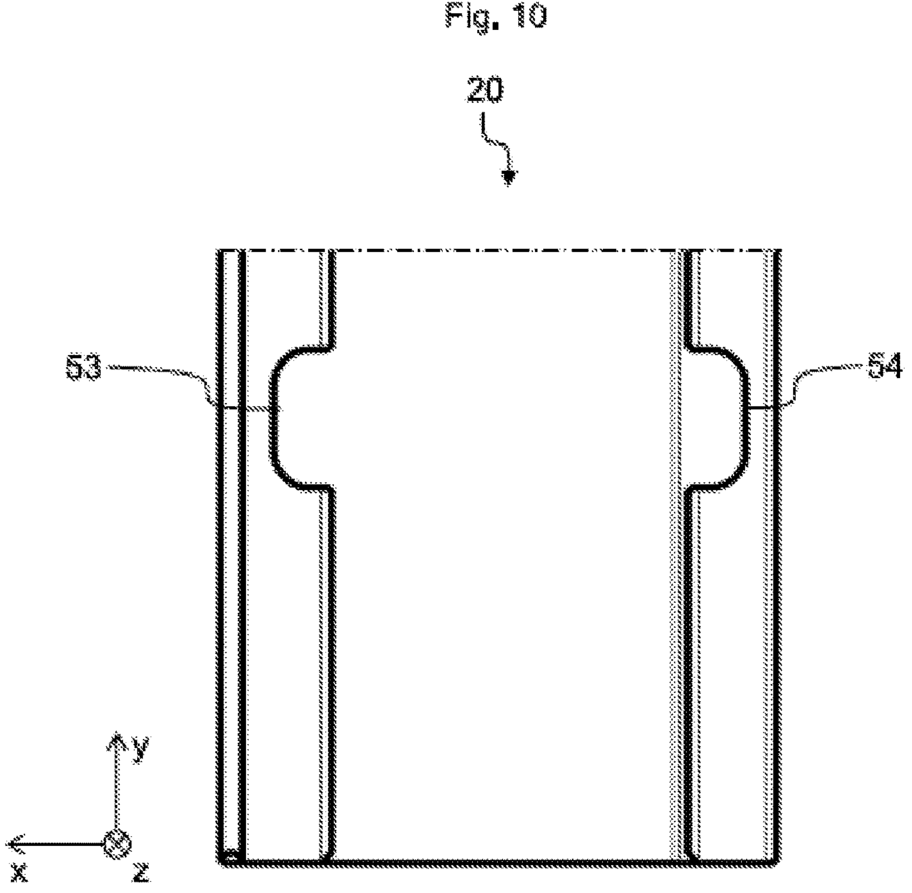
FIG. 11 shows the detailed view XI according to FIG. 9.

After adjusting the fastening devices 27, the masking plate 20 can be clipped onto the fastening devices 27. Here cut-outs 50 to 53 are provided to the rear of the masking plate, as shown in FIGS. 10 and 11. The height position sections 32 of the fastening devices 27 can be received in the cut-outs 50 to 53. The upper cut-outs 50, 51 shown in FIG. 10 act here as fixed bearings for the masking plate 20, and elongated lower cut-outs 52, 53 shown in FIG. 11 act as loose bearings for the masking plate 20.

Alternatively, the masking plate 20 can also be assembled hereon before adjusting the fastening devices 27. In this case, in the orientation in FIG. 3 an adjustment of the fastening devices 27 is possible from the rear with the aid of a tool inserted into the tool recess 45.

The fastening devices 27 are concealed and not visible, as a result of which a visually appealing design is enabled. It is possible to adjust the fastening device 27 gradually. The adjustment range is shown by way of the display symbols 38, 42. Once adjusted, the angular position of the eccentric body 39 and thus also the position of the masking plate 20 remains the same. As a result of two fastening devices 27 being provided for each masking plate 20, 21, an accurate adjustment is enabled. As a result of the fastening devices 27 being single-piece components, these can be established particularly cost-effectively, for instance as a plastic injection molded component. Furthermore, the eccentric body 39 is connected undetachably with the base body 28 with the aid of the hinge section 47.

Although the present invention was described on the basis of exemplary embodiments, it can be modified in a variety of ways.

The invention claimed is:

1. A fastening device for fastening a masking plate to an assembly strip of a household appliance, said fastening device comprising:

a base body having a receiving section, a first fastening section configured to be connected to an assembly aperture of the assembly strip, and a second fastening section configured to be connected to the masking plate;

an eccentric body configured to be receivable in the receiving section of the base body, wherein the eccentric body includes an engaging section configured to engage into the receiving section and a cylindrical eccentric section which is connected eccentrically with the engaging section; and a hinge section configured to connect the eccentric body with the base body and to enable the eccentric body to be folded with respect to the base body from an initial state, in which the eccentric body is arranged outside of the receiving section, into an end state, in which the engaging section of the eccentric body is received in the receiving section, wherein the hinge section is configured to position the eccentric body in a zero position when the eccentric body is folded with respect to the base body from the initial state into the end state in which the engaging section of the eccentric body is received in the receiving section such that the eccentric body is rotatable out of the zero position into any angular position and such that the hinge section is configured to shear off from the zero position when the eccentric body is rotated out of the zero position, and wherein the fastening device is configured to move in a linear manner along a predetermined direction with respect to the assembly strip when the eccentric body is rotated relative to the base body and against one or more side contours of the assembly aperture, thereby adjusting a position of the fastening device with respect to the assembly strip.

2. The fastening device of claim 1, wherein the first fastening section of the base body includes a suspension section for suspending the fastening device in the assembly aperture of the assembly strip.

3. The fastening device of claim 2, wherein the base body includes a locking section for engaging the fastening device in the assembly aperture.

4. The fastening device of claim 1, wherein the fastening device is a single-piece.

5. The fastening device of claim 1, wherein the fastening device is an integral, plastic component.

6. The fastening device of claim 1, wherein the second fastening section of the base body includes resiliently deformable snap-fit arms, which are configured to snap fit into the masking plate in a form-fit manner.

7. The fastening device of claim 6, wherein the snap-fit arms are connected to one another via a resiliently deformable spring section.

8. The fastening device of claim 1, wherein the base body has a height position section for positioning the fastening device on the masking plate, with the height position section configured to engage in a form-fit manner in cut-outs on the masking plate.

9. The fastening device of claim 1, wherein the engaging section is configured to engage in a form-fit manner into the receiving section.

10. The fastening device of claim 9, wherein the engaging section includes a tool cut-out configured to receive a tool for rotating the eccentric body.

11. The fastening device of claim 1, wherein the eccentric section includes a tool cut-out configured to receive a tool for rotating the eccentric body.

12. An assembly arrangement for a household appliance, said assembly arrangement comprising:

an assembly strip including an assembly aperture; and a fastening device configured to be suspended in the assembly aperture of the assembly strip, the fastening device comprising:

a base body having a receiving section, and a suspension section for suspending the fastening device in the assembly aperture of the assembly strip;

an eccentric body configured to be receivable in the receiving section of the base body, wherein the eccentric body includes an engaging section configured to engage into the receiving section and a cylindrical eccentric section which is connected eccentrically with the engaging section; and a hinge section configured to connect the eccentric body with the base body and to enable the eccentric body to be folded with respect to the base body from an initial state, in which the eccentric body is arranged outside of the receiving section, into an end state, in which the engaging section of the eccentric body is received in the receiving section, wherein the hinge section is configured to position the eccentric body in a zero position when the eccentric body is folded with respect to the base body from the initial state into the end state in which the engaging section of the eccentric body is received in the receiving section such that the eccentric body is rotatable out of the zero position into any angular position and such that the hinge section is configured to shear off from the zero position when the eccentric body is rotated out of the zero position, and wherein, when the suspension section of the fastening device is suspended in the assembly aperture of the assembly strip and the fastening device is in the end state, the fastening device is configured to move in a linear manner along a predetermined direction with respect to the assembly strip when the eccentric body is rotated relative to the base body and against one or more side contours of the assembly aperture, thereby adjusting a position of the fastening device with respect to the assembly strip.

13. The assembly arrangement of claim 12, further comprising a masking plate configured to be connected to the assembly strip by the fastening device, wherein the base body includes a fastening section configured to be connected to the masking plate.

14. A household appliance comprising the assembly arrangement of claim 12.

15. A household appliance, comprising:

a fastening device for fastening a masking plate to an assembly strip of the household appliance, said fastening device comprising:

a base body having a receiving section, a first fastening section configured to be connected to an assembly aperture of the assembly strip, and a second fastening section configured to be connected to the masking plate;

an eccentric body configured to be receivable in the receiving section of the base body, wherein the eccentric body includes an engaging section configured to engage into the receiving section and a cylindrical eccentric section which is connected eccentrically with the engaging section; and a hinge section configured to connect the eccentric body with the base body and to enable the eccentric body to be folded with respect to the base body from an initial state, in which the eccentric body is arranged outside of the receiving section, into an end state, in which the engaging section of the eccentric body is received in the receiving section, wherein the hinge section is configured to position the eccentric body in a zero position when the eccentric body is folded with respect to the base body from the initial state into the end state in which the engaging section of the eccentric body is received in the receiving section such that the eccentric body is rotatable out of the zero position into any angular position and such that the hinge section is configured to shear off from the zero position when the eccentric body is rotated out of the zero position, and wherein the fastening device is configured to move in a linear manner along a predetermined direction with respect to the assembly strip when the eccentric body is rotated relative to the base body and against one or more side contours of the assembly aperture, thereby adjusting a position of the fastening device with respect to the assembly strip.

* * * * *